United States Patent
Zucker

(10) Patent No.: US 6,692,868 B2
(45) Date of Patent: Feb. 17, 2004

(54) MELT BLOWN BATTERY SEPARATOR

(75) Inventor: Jerry Zucker, Charleston, SC (US)

(73) Assignee: Daramic, Inc., North Charleston, SC (US)

( * ) Notice: Subject to any disclaimer, the term of this patent is extended or adjusted under 35 U.S.C. 154(b) by 36 days.

(21) Appl. No.: 10/025,285

(22) Filed: Dec. 19, 2001

(65) Prior Publication Data

US 2003/0113619 A1 Jun. 19, 2003

(51) Int. Cl.⁷ ................................................. H01M 2/16
(52) U.S. Cl. ..................... 429/144; 429/247; 429/249; 429/250; 429/254
(58) Field of Search .................. 429/247, 249, 429/250, 254, 144

(56) References Cited

U.S. PATENT DOCUMENTS

| | | |
|---|---|---|
| 5,605,549 A | 2/1997 | Zucker |
| 5,679,379 A | 10/1997 | Fabbricante et al. |
| 5,962,161 A | 10/1999 | Zucker |
| 6,030,727 A * | 2/2000 | Tanaka et al. ............... 429/250 |
| 6,114,017 A | 9/2000 | Fabbricante et al. |
| 6,120,939 A | 9/2000 | Whear et al. |
| 2002/0045091 A1 * | 4/2002 | Kamei et al. ................. 429/62 |

FOREIGN PATENT DOCUMENTS

| | | |
|---|---|---|
| EP | 0203459 | 12/1986 |
| EP | 0498414 | 8/1992 |
| EP | 0634802 | 1/1995 |
| EP | 0981172 | 2/2000 |
| JP | 2-133607 | 5/1990 |
| JP | 2-133608 | 5/1990 |
| JP | 3-55755 | 3/1991 |
| JP | 4-346825 | 12/1992 |
| JP | 5-106112 | 4/1993 |

OTHER PUBLICATIONS

David Linden, "Handbook of Batteries", McGraw–Hill, Inc. 1995.*

J. M. G. Cowie, "Polymers: Chemistry and Physics of Modern Materials", Chapman and Hall, 1991.*

U.S. patent application Ser. No. 09/745.026, Whear et al., filed Dec. 20, 2000.

* cited by examiner

Primary Examiner—Carol Chaney
Assistant Examiner—Dah-Wei D. Yuan
(74) Attorney, Agent, or Firm—Robert H. Hammer, III

(57) ABSTRACT

Battery separators made of a wettable, uniform mat of melt blown fibers. The melt blown fibers are thermally bonded to one another. These fibers are made of a thermoplastic material. The fibers have a diameter in the range of 0.1 to 13 microns ($\mu$) and lengths greater than 12 millimeters (mm). The mat has a basis weight ranging from 6 to 160 grams per square meter (g/m²), a thickness of less than 75 microns ($\mu$), and an average pore size of 0.3 to 50 microns ($\mu$).

14 Claims, No Drawings

MELT BLOWN BATTERY SEPARATOR

FIELD OF THE INVENTION

A battery separator is made from a wettable, uniform mat of thermoplastic melt blown fibers.

BACKGROUND OF THE INVENTION

A battery is an electrochemical device comprising an anode, a cathode, a separator sandwiched between the anode and cathode, and an electrolyte wetting the separator and in ionic communication between the anode and the cathode. Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 1995, both of which are incorporated herein by reference.

The separator is a critical element of the battery. It is used as a spacer between the anode and cathode to prevent electronic contact of the anode and the cathode. It must be sufficiently permeable to allow ion transport between the anode and the cathode, but must have pores that will block the migration of particles that separate from the electrodes. It must have sufficient strength and/or tortuosity to prevent dendrites from growing through the separator and causing a short circuit within the battery. It must also have sufficient strength to withstand the battery manufacturing process. Such strength manifests itself, in one instance, as puncture strength, the ability withstand being pierced by the rough surfaces of the electrodes during battery manufacture. Such strength also manifests itself, in another instance, as tensile strength, the ability to withstand the tight winding required to obtain the battery's physical structure. The separator must also be thin, so as not to take up too much space within the cell. Accordingly, there is a need for tough, strong, thin, and permeable structures for use as separators in batteries.

One structure for obtaining such qualities is a nonwoven material or fabric. See, for example, Besenhard, Ibid., page 288 and U.S. Pat. Nos. 5,605,549; 5,962,161; 6,120,939; and U.S. application Ser. No. 09/745,026 filed Dec. 20, 2000, each of which is incorporated herein by reference. Nonwoven materials encompass a broad class of fibrous structures. Nonwoven material, in its most common usage, includes fibrous structures made by such processes as dry, wet, or air laying, needlepunching, spunbond or melt blown processes, and hydroentanglement. Melt blown nonwovens are different from spunbond nonwovens. Spunbond nonwovens are formed by extruding molten polymer into filaments, drawing the filaments, and then laying those filaments onto a continuous belt, that result in a nonwoven with long fiber lengths. Melt blown nonwovens are formed by extruding molten polymer through a die then attenuating and breaking the resulting filaments with hot, high-velocity air or steam, that results in a nonwoven with short fiber lengths. As battery separators, melt blown nonwovens are perceived as having some adequately sized pores within the distribution of pore sizes, but having to broad a distribution of pore sizes (thus having to many inadequately, too large, sized pores and having insufficient tensile and puncture strength, both of which limit their ability to be used as effective battery separators.

Electrolytes, used in the most widely sold batteries, may be aqueous (polar) or organic (nonpolar) solutions. Since, batteries are most often assembled without electrolyte, and are later activated by the addition of the electrolyte, the separator must be wettable by the electrolyte. "Wettability" or "wet out" refers to the ability to cause a liquid to penetrate more easily into, or spread over, the surface of another material. Hydrophilic refers to the ability to "wet out" an aqueous based liquid. Hydrophobic refers to the inability to "wet out" an aqueous based liquid. Accordingly, nonwovens, which are, most often, made of polyolefins, will not wet out aqueous based electrolytes because polyolefins are inherently hydrophobic. Therefore, such nonwovens must be made hydrophilic so that the aqueous electrolyte will wet out the separator.

Accordingly, there is a need for a wettable, melt blown nonwoven separator having sufficient mechanical properties and sufficiently small pores for use as a separator in a battery.

SUMMARY OF THE INVENTION

Battery separators are made of a wettable, uniform mat of melt blown fibers. The melt blown fibers are thermally bonded to one another. These fibers are made of a thermoplastic material. The fibers have a diameter in the range of 0.1 to 13 microns ($\mu$) and lengths greater than 12 millimeters (mm). The mat has a basis weight ranging from 6 to 160 grams per square meter ($g/m^2$), a thickness of less than 75 microns ($\mu$), and an average pore size of 0.3 to 50 microns ($\mu$).

DESCRIPTION OF THE INVENTION

A battery generally comprises an anode, a cathode, a separator, and an electrolyte. The separator is located between the anode and the cathode. The electrolyte is in fluid communication between the anode and the cathode via the separator. While the instant invention may be used in any battery, it is preferably used in alkaline battery systems and lithium battery systems. Most preferred is its use in alkaline battery systems. For example, alkaline battery systems include nickel cadmium (NiCd) systems and nickel metal hydride (NiMH) systems. Moreover, the battery may be either a primary or secondary battery system. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 1995, both of which are incorporated herein by reference. Hereinafter, the instant invention will be described in relationship to the preferred battery system, the alkaline batteries.

A mat of melt blow fibers typically refers to a web consisting of fine and short fibers. Fine fiber refers to fibers with diameters of 2 to 10 microns, and short fiber refers to fibers with lengths less than 12 millimeters. It is believed that the mechanical weakness of melt blown webs is due to the fact that the fibers are short. Yet, because of the nature of the process for making melt blown webs, i.e., using a high velocity fluid stream (e.g., air) to attenuate the molten thermoplastic as it is discharged from a die, it is commercially impracticable to obtain the long fibers lengths. Fiber lengths are limited to less than 12 millimeters.

The instant invention utilizes a mat of melt blown fibers having a basis weight of 6 to 160 grams per square meter, a thickness of less than 75 microns, and an average pore size (i.e., equivalent diameter) of 0.3 to 50 microns. The fibers have diameters in the range of 0.1 to 13 microns with 50% of the fibers having diameters less than 0.5 microns, and have lengths that are nearly continuous, e.g., greater than 12 millimeters. These mats are made according to the method set forth in U.S. Pat. Nos. 5,679,379 and 6,114,017, both of which are incorporated herein by reference, and may be calendered. The basis weight may range from 10 to 35 grams per square meter. The thickness may range between 12 and 50 microns. The average pore size may range between 1 and 25 microns. The fibers may have diameters in the range of 0.1 to 5 microns with 85% of the fibers having diameters less than 0.5 microns.

The fibers are thermally bonded to one another and are uniform, i.e., not showing significant shot, clumps, twined fibers, or fiber bundles that are typically seen as causing non-uniformity in melt blown webs. The webs are preferably made of a thermoplastic polymer; preferred thermoplastic polymers are polyolefins, such as polyethylenes, polypropylenes, and combinations thereof. It is preferred that these materials have relatively high melt flow indices.

The melt blown web must be wet out the electrolyte. Since melt blown webs are mostly made of thermoplastics polymers, such as polyolefins, they must be treated to become hydrophilic, if they are used in battery systems that have aqueous based electrolytes. One such hydrophilizing treatment is disclosed in U.S. Pat. No. 5,962,161, incorporated herein by reference. The instant invention, however, is not so limited, and any hydrophilizing treatment of a polyolefin may be used. Other hydrophilizing treatments for polyolefins include: coating with a surfactant (or surface active agent or wetting agent); coating with polymers, the polymers having different (i.e., better) surface active properties than the polyolefins; surface activation (e.g., by plasma treatment); surface roughening to increase surface area (e.g., forming the surface); and blending the polyolefin with other polymers, the blending having different (i.e., better) surface active properties than the polyolefin. Examples of the foregoing are illustrated in Japanese Kokai Nos. 2-133608 (published May 22, 1990); 2-133607 (May 22, 1990); 3-55755 (Mar. 11, 1991); 4-346825 (Dec. 2, 1992); and 5-106112 (Apr. 17, 1993); and European Patent Publication Nos. 981,172 A1 (Feb. 23, 2000); 498,414 A2 (Aug. 12, 1992); 634,802 A1 (Jan. 18, 1995); and 203,459 A2 (Dec. 3, 1986).

The foregoing web may also be included in a composite structure, e.g., a multi-layered separator. For example, two or more of the foregoing webs may be laminated together to increase to overall thickness of the separator. The foregoing web may be laminated to one or more different type(s) of nonwoven web(s) (e.g., a spunbond web) to, for example, increase the strength of the separator or alter the compressibility of the separator. The foregoing web may be laminated to a membrane (e.g., microporous or permeable) to, for example, alter the permeability of the separator or increasing the safety of the separator by adding a shut-down feature to the separator (i.e., enabling the separator to rapidly increase electrical resistance by blinding pores so as to prevent ion flow between the electrodes).

EXAMPLES

Melt blown webs made according to the method disclosed in U.S. Pat. No. 6,114,017 and using a melt blowing grade of polypropylene resin with a melt flow index of 35. Those webs have the following properties that are measured in a conventional manner.

TABLE

| Example | Basis Weight | Fiber Diameter | Breaking Load |
|---------|--------------|----------------|---------------|
| 1  | 10.3 | 2.7  | 241 |
| 2  | 17.8 | 2.9  | 456 |
| 3  | 11.7 | 2.2  | 299 |
| 4  | 16.5 | 2.7  | 423 |
| 5  | 12.1 | 1.9  | 270 |
| 6  | 34.6 | 2.9  | 847 |
| 7  | 25.4 | 3.0  | 671 |
| 8  | 30.0 | 2.5  | 815 |
| 9  | 15.3 | 12.1 | 548 |
| 10 | 25.3 | 0.5  | 622 |

The present invention may be embodies in other specific forms without departing from the spirit or essential attributes thereof, and, accordingly, reference should be made to the appended claims, rather than to the foregoing specification, as indicating the scope of the invention.

What is claimed is:

1. A battery separator comprising:
a wettable, uniform mat of melt blown fibers, said fibers being thermally bonded to one another, said fibers being made of a thermoplastic material, said fibers having diameters in the range of 0.1 to 13 microns with 50% of said fibers having diameters less than 0.5 microns, said fibers having lengths greater than 12 millimeters, said mat having a basis weight ranging from 6 to 160 grams per square meter and a thickness of less than 75 microns, and an average pore size ranging from 0.3 to 50 microns.

2. The battery separator of claim 1 wherein said thermoplastic material being a polyolefin.

3. The battery separator of claim 2 wherein said polyolefin being selected from the group consisting of polyethylene, polypropylene and combinations thereof.

4. The battery separator of claim 1 wherein said wettable mat further comprising means for hydrophilizing.

5. The battery separator of claim 1 wherein said fibers having diameters in the range of 0.1 to 5 microns with 85% of the fibers having diameters less than 0.5 microns.

6. The battery separator of claim 1 wherein said mat having a basis weight in the range of 10 to 35 grams per square meter.

7. A multi-layered battery separator wherein one said layer being said mat of melt blown fibers of claim 1.

8. A battery comprising:
an anode, a cathode, a separator sandwiched between said anode and said cathode, and an electrolyte wetted out on said separator and being in ionic communication with said anode and said cathode, said separator further comprising a uniform mat of melt blown fibers, said fibers being thermally bonded to one another, said fibers being made of a thermoplastic material, said fibers having diameters in the range of 0.1 to 13 microns with 50% of said fibers having diameters less than 0.5 microns, said fibers having lengths greater than 12 millimeters, said mat having a basis weight in the range of 6 to 160 grams per square meter, a thickness less than 75 microns, and an average pore size of 0.3 to 50 microns.

9. The battery of claim 8 wherein said thermoplastic material being a polyolefin.

10. The battery of claim 9 wherein said polyolefin being selected from the group consisting of polyethylene, polypropylene and combinations thereof.

11. The battery of claim 8 wherein said wettable mat further comprising means for hydrophilizing.

12. The battery of claim 8 wherein said fibers having diameters in the range of 0.1 to 5 microns with 85% of the fibers having diameters less than 0.5 microns.

13. The battery of claim 8 wherein said mat having a basis weight in the range of 10 to 35 grams per square meter.

14. The battery of claim 8 wherein said separator further comprising a multi-layered separator wherein one said layer being said mat of melt blown fibers of claim 9.

* * * * *